United States Patent
Nakamura

(10) Patent No.: US 10,519,258 B2
(45) Date of Patent: Dec. 31, 2019

(54) DIP-FORMING SYNTHETIC ISOPRENE POLYMER LATEX, DIP-FORMING COMPOSITION, AND DIP-FORMED ARTICLE

(71) Applicant: ZEON CORPORATION, Tokyo (JP)

(72) Inventor: Yoshiyuki Nakamura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 85 days.

(21) Appl. No.: 15/546,597

(22) PCT Filed: Feb. 15, 2016

(86) PCT No.: PCT/JP2016/054213
§ 371 (c)(1),
(2) Date: Jul. 26, 2017

(87) PCT Pub. No.: WO2016/140043
PCT Pub. Date: Sep. 9, 2016

(65) Prior Publication Data
US 2018/0022841 A1   Jan. 25, 2018

(30) Foreign Application Priority Data

Mar. 3, 2015   (JP) .................................. 2015-041011

(51) Int. Cl.
| | |
|---|---|
| *C08F 36/08* | (2006.01) |
| *C08J 3/07* | (2006.01) |
| *B29C 41/14* | (2006.01) |
| *B29K 7/00* | (2006.01) |

(52) U.S. Cl.
CPC .............. *C08F 36/08* (2013.01); *B29C 41/14* (2013.01); *C08J 3/07* (2013.01); *B29K 2007/00* (2013.01)

(58) Field of Classification Search
CPC ...................................................... C08F 36/08
See application file for complete search history.

(56) References Cited

U.S. PATENT DOCUMENTS

| | | | |
|---|---|---|---|
| 2009/0281211 A1 | 11/2009 | Van Der Huizen et al. | |
| 2015/0376322 A1 | 12/2015 | Nakamura et al. | |

FOREIGN PATENT DOCUMENTS

| | | |
|---|---|---|
| EP | 1 935 925 A1 | 6/2008 |
| JP | 2009-179680 A | 8/2009 |
| JP | 2009-533501 A | 9/2009 |
| TW | 201443137 A | 11/2014 |

OTHER PUBLICATIONS

Apr. 26, 2016 International Search Report issued in International Patent Application No. PCT/JP2016/054213.
Sep. 5, 2017 International Preliminary Report on Patentability issued in International Patent Application No. PCT/JP2016/054213.

*Primary Examiner* — Wenwen Cai
(74) *Attorney, Agent, or Firm* — Oliff PLC

(57) ABSTRACT

A dip-forming synthetic isoprene polymer latex contains a synthetic isoprene polymer which has been subjected to solution polymerization using an alkyllithium polymerization catalyst. A ratio between a mode diameter and a median diameter (mode diameter/median diameter) of a particle diameter of the latex is 0.8 or more. A Brookfield viscosity difference ($V_{66}$–$V_{56}$) between a Brookfield viscosity at a solid content concentration of 56% ($V_{56}$) and a Brookfield viscosity at a solid content concentration of 66% ($V_{66}$) is 200 mPa·s or less.

10 Claims, No Drawings

DIP-FORMING SYNTHETIC ISOPRENE POLYMER LATEX, DIP-FORMING COMPOSITION, AND DIP-FORMED ARTICLE

TECHNICAL FIELD

The present invention relates to a dip-forming synthetic isoprene polymer latex, a dip-forming composition, and a dip-formed article. More specifically, the present invention relates to a dip-forming synthetic isoprene polymer latex having a specific particle diameter distribution, a dip-forming composition containing this latex, and a dip-formed article obtained by dip-forming this composition.

BACKGROUND ART

Conventionally, it has been known to dip-form a dip-forming composition containing a latex of natural rubber to obtain a dip-formed article such as a nipple, a balloon, a glove, a medical balloon, a sack, or the like, which is used in contact with a human body. However, a latex of natural rubber contains proteins to cause an allergic symptom to a human body, and therefore has a problem as a dip-formed article in direct contact with the mucous membrane or organs of the body in some cases. Thus, consideration for using a synthetic isoprene polymer in place of the natural rubber has been made, and the use amount of the synthetic isoprene polymer has been increased year by year.

In order to cope with this situation, it is necessary to transport a large amount of a synthetic isoprene polymer latex. However, cost for transportation at a low concentrations is high, and therefore transportation at a concentration as high as possible has been demanded. However, a currently used synthetic isoprene polymer latex tends to rapidly increase viscosity around a solid content concentration of 62%, and accordingly there has been a limitation for making the concentration higher.

For example, Patent Literature 1 discloses a method for manufacturing a synthetic isoprene polymer latex, including dissolving a synthetic isoprene polymer in a solvent, emulsifying the synthetic isoprene polymer together with a surfactant, removing the solvent, and performing centrifugation. However, a latex manufactured by this method has a high viscosity at a high concentration, and therefore a trouble may occur, for example, the latex does not flow in an apparatus.

CITATION LIST

Patent Literature

Patent Literature 1: JP 2009-179680 A

SUMMARY OF INVENTION

Technical Problem

An object of the present invention is to provide a dip-forming synthetic isoprene polymer latex capable of suppressing an increase in a viscosity even at a high concentration. Another object of the present invention is to provide a dip-forming composition containing this latex and a dip-formed article obtained by dip-forming this composition.

Solution to Problem

The present inventors have made intensive studies to solve the above problems. As a result, the present inventors have found that a synthetic isoprene polymer latex containing a synthetic isoprene polymer obtained by solution polymerization using an alkyllithium polymerization catalyst, having a particle diameter distribution controlled in a predetermined range can suppress an increase in a viscosity to a predetermined value or less even at a high concentration, and have completed the present invention.

That is, the present invention provides:

(1) a dip-forming synthetic isoprene polymer latex containing a synthetic isoprene polymer obtained by solution polymerization using an alkyllithium polymerization catalyst, in which a ratio between a mode diameter and a median diameter (mode diameter/median diameter) of a particle diameter of the latex is 0.8 or more, and a Brookfield viscosity difference ($V_{66}-V_{56}$) between a Brookfield viscosity at a solid content concentration of 56% ($V_{56}$) and a Brookfield viscosity at a solid content concentration of 66% ($V_{66}$) is 200 mPa·s or less;

(2) a dip-forming composition containing the dip-forming synthetic isoprene polymer latex described in (1), a sulfur-based vulcanizing agent, and a vulcanization accelerator; and (3) a dip-formed article obtained by dip-forming the dip-forming composition described in (2).

Advantageous Effects of Invention

The present invention can provide a dip-forming synthetic isoprene polymer latex capable of suppressing an increase in a viscosity even at a high concentration. The present invention can further provide a dip-forming composition containing this latex and a dip-formed article obtained by dip-forming this composition.

DESCRIPTION OF EMBODIMENTS

Hereinafter, a dip-forming synthetic isoprene polymer latex of the present invention will be described. The dip-forming synthetic isoprene polymer latex of the present invention is a dip-forming synthetic isoprene polymer latex containing a synthetic isoprene polymer obtained by solution polymerization using an alkyllithium polymerization catalyst. A ratio between a mode diameter and a median diameter (mode diameter/median diameter) of a particle diameter of the latex is 0.8 or more. A Brookfield viscosity difference ($V_{66}-V_{56}$) between a Brookfield viscosity at a solid content concentration of 56% ($V_{56}$) and a Brookfield viscosity at a solid content concentration of 66% ($V_{66}$) is 200 mPa·s or less.

(Synthetic Isoprene Polymer)

A synthetic isoprene polymer used in the present invention is obtained by polymerizing isoprene. The synthetic isoprene polymer used in the present invention may be obtained by copolymerizing isoprene and another ethylenically unsaturated monomer copolymerizable therewith. The content of an isoprene unit in the synthetic isoprene polymer is preferably 70% by weight or more, more preferably 90% by weight or more, still more preferably 95% by weight or more, and particularly preferably 100% by weight (homopolymer of isoprene) with respect to the total monomer units because a flexible dip-formed article having an excellent tensile strength is easily obtained.

Examples of the other ethylenically unsaturated monomer copolymerizable with isoprene include a conjugated diene monomer other than isoprene, such as butadiene, chloroprene, or 1,3-pentadiene; an ethylenically unsaturated nitrile monomer such as acrylonitrile, methacrylonitrile, fumaronitrile, or α-chloro acrylonitrile; a vinyl aromatic monomer such as styrene or alkyl styrene; an ethylenically unsaturated carboxylate monomer such as methyl (meth)acrylate, ethyl (meth)acrylate, butyl (meth)acrylate, or 2-ethylhexyl (meth) acrylate; and a crosslinkable monomer such as divinylbenzene, diethylene glycol di(meth)acrylate, or pentaerythritol (meth)acrylate. Note that, these other ethylenically unsaturated monomers copolymerizable with isoprene may be used singly or in combination of two or more kinds thereof. Note that here, "(meth)acrylate" means both "acrylate" and "methacrylate".

As the isoprene unit in the synthetic isoprene polymer, four types of a cis-bond unit (1,4-cis structure), a trans-bond unit (1,4-trans structure), a 1,2-vinyl bond unit, and a 3,4-vinyl bond unit exist according to a bonding state of isoprene.

The content ratio (cis content ratio) of the cis-bond unit (1,4-cis structure) in the isoprene unit contained in the synthetic isoprene polymer is 60% by weight or more, and preferably 70% by weight or more with respect to the total isoprene units from a viewpoint of improving a tensile strength of the resulting dip-formed article.

A weight average molecular weight of the synthetic isoprene polymer is from 10,000 to 5,000,000, preferably from 500,000 to 5,000,000, and particularly preferably from 800,000 to 4,000,000 in terms of standard polystyrene by gel permeation chromatographic analysis. When the weight average molecular weight of the synthetic isoprene polymer is within the above range, a phenomenon that the tensile strength of a dip-formed article is lowered due to an excessively small weight average molecular weight can be suppressed, and a phenomenon that a synthetic isoprene polymer latex is not easily manufactured due to an excessively large weight average molecular weight can be suppressed.

Further, the polymer Mooney viscosity of the synthetic isoprene polymer [$ML_{1+4}$, 100° C.] is preferably from 50 to 80, more preferably from 60 to 80, and still more preferably from 70 to 80.

The synthetic isoprene polymer can be obtained by subjecting isoprene to solution polymerization in an inert polymerization solvent using a polymerization catalyst. In the present invention, as the polymerization catalyst, an alkyllithium polymerization catalyst such as n-butyl lithium or sec-butyl lithium is used. Among these catalysts, n-butyl lithium is preferably used. By using an alkyllithium polymerization catalyst, a polymerization reaction can be performed at a high polymerization conversion rate.

Further, in the present invention, in polymerization of the synthetic isoprene polymer, a polymerization accelerator is preferably used in addition to the polymerization catalyst. Examples of the polymerization accelerator include tetramethylethylenediamine (TMEDA), hexamethylphosphoramide (HMPA), N,N'-dimethylpropylene urea (DMPU), and dimethyl sulfoxide (DMSO). Among these polymerization accelerators, TMEDA is preferably used.

(Dip-Forming Synthetic Isoprene Polymer Latex)

The dip-forming synthetic isoprene polymer latex of the present invention (hereinafter, also simply referred to as "synthetic isoprene polymer latex") contains the above synthetic isoprene polymer. Preferable examples of a method for manufacturing the synthetic isoprene polymer latex include a method for manufacturing the synthetic isoprene polymer latex by emulsifying in water a solution or a fine suspension of a synthetic isoprene polymer dissolved or finely dispersed in an organic solvent in the presence of a surfactant, and removing the organic solvent as necessary from a viewpoint of being able to use a synthetic isoprene polymer having a high content ratio of a cis-bond unit in an isoprene unit, and being able to obtain a dip-formed article having an excellent tensile strength.

As described above, the synthetic isoprene polymer used in the present invention can be obtained by subjecting isoprene to solution polymerization in an inert polymerization solvent using an alkyllithium polymerization catalyst such as n-butyl lithium or sec-butyl lithium. A polymer solution of the resulting synthetic isoprene polymer is preferably used as it is.

At this time, after the isoprene polymer is synthesized, impurities such as a residue of the polymerization catalyst remaining in the polymer solution may be removed. Further, an anti-aging agent described below may be added to the solution during or after polymerization.

Examples of the organic solvent used in the above manufacturing method include an aromatic hydrocarbon solvent such as benzene, toluene, or xylene; an alicyclic hydrocarbon solvent such as cyclopentane, cyclopentene, cyclohexane, or cyclohexene; an aliphatic hydrocarbon solvent such as pentane, hexane, or heptane; and a halogenated hydrocarbon solvent such as methylene chloride, chloroform, or ethylene dichloride. Among these solvents, an aromatic hydrocarbon solvent, an alicyclic hydrocarbon solvent, and an aliphatic hydrocarbon solvent are preferable, and cyclohexane, toluene, n-hexane, and pentane are particularly preferable.

Note that, the use amount of the organic solvent is preferably 2,000 parts by weight or less, and more preferably from 20 to 1,500 parts by weight with respect to 100 parts by weight of the synthetic isoprene polymer.

Further, in the synthetic isoprene polymer latex of the present invention, a ratio between a mode diameter and a median diameter (mode diameter/median diameter) of a particle diameter of the latex is 0.8 or more, preferably 0.9 or more and 1.8 or less, more preferably 1.0 or more and 1.5 or less, and most preferably 1.0 or more and 1.1 or less. In a case where this value is less than 0.8, when a solid content concentration of the latex is 66% or more, a viscosity is too high. On the other hand, in a case where this value is more than 2.0, the latex on a side of a large particle diameter tends to be unstable.

Here, the mode diameter means a particle diameter having the largest existence probability of a particle, indicating a maximum value in a particle diameter distribution curve obtained by plotting an existence frequency of an individual particle diameter against a logarithm of the particle diameter.

Further, the median diameter means a particle diameter at a cumulative 50% point in a particle diameter distribution determined based on a volume from a side of a small particle diameter (oversize). The median diameter is also referred to as a 50% average particle diameter.

In a particle diameter of the synthetic isoprene polymer latex of the present invention, a method for adjusting a ratio between a mode diameter and a median diameter (mode diameter/median diameter) to 0.8 or more is not particularly limited. Examples thereof include a method for changing the kind of a surfactant, the use amount thereof, an addition method thereof (adding all together, adding in batches, or the like), and an emulsification condition of an emulsifier during emulsification.

The kind of a surfactant during emulsification is not particularly limited. However, a sodium or potassium salt of a fatty acid such as lauric acid, myristic acid, palmitic acid, oleic acid, linolenic acid, or rosin acid is preferable. Among these surfactants, a rosinate is most preferable from a viewpoint of ease of handling, availability, safety, or the like.

Examples of a surfactant which can be used together with the above sodium or potassium salt of a fatty acid include a nonionic surfactant such as polyoxyethylene alkyl ether, polyoxyethylene alkylphenol ether, polyoxyethylene alkyl ester, or polyoxyethylene sorbitan alkyl ester; an anionic surfactant such as an alkyl benzene sulfonate such as sodium dodecylbenzenesulfonate, higher alcohol sulfate, or alkyl sulfosuccinate; a cationic surfactant such as alkyl trimethyl ammonium chloride, dialkyl dimethyl ammonium chloride, or alkyl benzyl dimethyl ammonium chloride; and a copolymerizable surfactant such as α,β-unsaturated carboxylic acid sulfo ester, α,β-unsaturated carboxylic acid sulfate ester, or sulfoalkyl aryl ether. These surfactants may be used singly or in combination of two or more kinds thereof.

The use amount of a surfactant is not particularly limited. For example, the use amount of the above salt of a fatty acid is preferably from 3 to 30 parts by weight, more preferably from 5 to 20 parts by weight, particularly preferably from 7 to 15 parts by weight, and most preferably from 8 to 10 parts by weight with respect to 100 parts by weight of the synthetic isoprene polymer. When the use amount of a surfactant is within the above range, a phenomenon that the amount of aggregates is increased due to an excessively small use amount can be suppressed, and a phenomenon that foaming occurs easily and a problem occurs during dip-forming due to an excessively large use amount can be suppressed.

A method for adding a surfactant is not particularly limited. A surfactant may be added in advance to water and/or an organic solvent solution or a fine suspension of a synthetic isoprene polymer, or may be added to an emulsified liquid in the middle of an emulsification operation. A surfactant may be added all together or added in batches. Note that, examples of a method for adding a surfactant in batches include a method for decreasing the use amount of a surfactant at an initial stage of emulsification and increasing the use amount of a surfactant during emulsification. The method for decreasing the use amount of a surfactant at an initial stage of emulsification and increasing the use amount of a surfactant during emulsification is an effective means for adjusting a ratio of mode diameter/median diameter within a preferable range in a method for obtaining a latex by gradually adding an isoprene polymer solution to a surfactant aqueous solution for emulsification.

A method for changing an emulsification condition of an emulsifier is not particularly limited. Examples thereof include a method for selecting an optimum combination of teeth (generators) of an emulsifier, a method for changing a hole diameter or a gap of a rotor/stator of an emulsifier, a method for changing a shearing force during emulsification in the middle of emulsification, a method for blending a substance having short emulsification time with a substance having long emulsification time, and a method for changing a ratio between water and a synthetic isoprene polymer. Among these examples, the method for selecting an optimum combination of teeth (generators) of an emulsifier and the method for changing a hole diameter or a gap of a rotor/stator of an emulsifier are preferable.

One of these changes in the kind of a surfactant, the use amount thereof, an addition method thereof (adding all together, adding in batches, or the like), and an emulsification condition during emulsification may be performed, or two or more thereof may be performed in combination.

The amount of water used in the above method for manufacturing the synthetic isoprene polymer latex is preferably from 50 to 5,000 parts by weight, and more preferably from 100 to 3,000 parts by weight with respect to 100 parts by weight of the synthetic isoprene polymer.

Examples of the kind of water used include hard water, soft water, ion-exchanged water, distilled water, and zeolite water. A polar solvent represented by an alcohol such as methanol may be used together with water.

As an apparatus for emulsifying an organic solvent solution or a fine suspension of the synthetic isoprene polymer in the presence of a surfactant in water, an apparatus commercially available generally as an emulsifier or a disperser can be used without any particular limitation.

Examples of the emulsifying apparatus include a batch type emulsifier such as product name "Homogenizer" (manufactured by IKA Co., Ltd.), product name "Polytron" (manufactured by Kinematica Co., Ltd.), or product name "TK Auto Homo Mixer" (manufactured by Tokushu Kika Kogyo Co., Ltd.); a continuous emulsifier such as product name "TK Pipeline Homo Mixer" (manufactured by Tokushu Kika Kogyo Co., Ltd.), product name "Colloid Mill" (manufactured by Shinko Pantec Co., Ltd.), product name "Thrasher" (manufactured by Nippon coke industry Co., Ltd.), product name "Trigonal Wet Milling Machine" (manufactured by Mitsui Miike Machinery Co., Ltd.), product name "Cavitron" (manufactured by Euro-Tech Co., Ltd.), product name "Milder" (manufactured by Pacific Machinery & Engineering Co., Ltd.), or product name "Fine Flow Mill" (manufactured by Pacific Machinery & Engineering Co., Ltd.); a high-pressure emulsifier such as product name "Microfluidizer" (manufactured by Mizuho Industrial Co., Ltd.), product name "Nanomizer" (manufactured by Nanomizer Co., Ltd.), or product name "APV Gaulin" (manufactured by Gaulin Co., Ltd.); a membrane emulsifier such as a membrane emulsifier (manufactured by REICA Co., Ltd.); a vibration type emulsifier such as product name "Vibro Mixer" (manufactured by REICA Co., Ltd.); and an ultrasonic emulsifier such as product name "Ultrasonic Homogenizer" (manufactured by Branson Co., Ltd.). Note that, conditions for the emulsification operation using the emulsifying apparatus are not particularly limited. The conditions such as a treatment temperature, a treatment time, and the like may be appropriately selected so as to obtain a desired dispersion state.

In the above method for manufacturing the synthetic isoprene polymer latex, it is preferable to obtain a synthetic isoprene polymer latex by removing an organic solvent from an emulsified product obtained through the emulsification operation. A method for removing the organic solvent from the emulsified product is not particularly limited, but reduced pressure distillation, atmospheric pressure distillation, steam distillation, centrifugation, or the like can be employed.

Note that, aggregates may be removed before and after the operation for removing an organic solvent.

Further, after an organic solvent is removed, if necessary, in order to increase a solid content concentration of the synthetic isoprene polymer latex, distillation under reduced pressure, atmospheric distillation, centrifugation, membrane concentration, or other method may be used for a concentration operation.

The solid content concentration of the synthetic isoprene polymer latex is preferably from 30 to 70% by weight, and more preferably from 40 to 70% by weight. When the solid content concentration is within the above range, a phenomenon that synthetic isoprene polymer particles are separated from each other during storage of the synthetic isoprene polymer latex due to an excessively low solid content concentration can be suppressed, and a phenomenon that synthetic isoprene polymer particles are aggregated to each other to form a coarse aggregate due to an excessively high solid content concentration can be suppressed.

Further, in the synthetic isoprene polymer latex of the present invention, a Brookfield viscosity difference ($V_{66}$-$V_{56}$) between a Brookfield viscosity at a solid content concentration of 56% ($V_{56}$) and a Brookfield viscosity at a solid content concentration of 66% ($V_{66}$) is 200 mPa·s or less, and is preferably 150 mPa·s or less. When this difference ($V_{66}$-$V_{56}$) is more than 200 mPa·s, the latex does not flow easily in a condenser, and it is necessary to stop concentrated at a low concentration. Furthermore, by setting this difference ($V_{66}$-$V_{56}$) within the above range, the latex can be concentrated to a high concentration, and cost for transportation can be suppressed.

Note that, the viscosity in the present invention is a value of a viscosity at a liquid temperature of 25° C., measured using a Brookfield viscometer (hereinafter, also referred to as "B type viscometer").

Examples of a method for setting a Brookfield viscosity difference ($V_{66}$-$V_{56}$) between a Brookfield viscosity at a solid content concentration of 56% ($V_{56}$) and a Brookfield viscosity at a solid content concentration of 66% ($V_{66}$) to 200 mPa·s or less include a method for adjusting the kind and the use amount of a water-soluble substance such as a surfactant or a thickening agent, and a method for adjusting the pH of the latex.

As the surfactant, surfactants exemplified in the above description of control of a particle diameter can be used. Among these surfactants, a sodium or potassium salt of a fatty acid such as lauric acid, myristic acid, palmitic acid, oleic acid, linolenic acid, or rosin acid is preferable.

The use amount of these surfactants cannot be said definitely because an optimum amount thereof depends on the kind of a surfactant. However, in examples of sodium rosinate and potassium rosinate, the use amount is preferably 3 parts by weight or less, and is more preferably 2 parts by weight or less with respect to 100 parts by weight of the synthetic isoprene polymer.

The thickening agent is not particularly limited. Examples thereof include a cellulose polymer such as carboxymethylcellulose, methylcellulose, or hydroxypropylcellulose, and an ammonium salt or an alkali metal salt thereof; (modified) poly(meth)acrylic acid and an ammonium salt or an alkali metal salt thereof; polyvinyl alcohols such as (modified) polyvinyl alcohol, a copolymer of acrylic acid or acrylate and vinyl alcohol, or a copolymer of maleic anhydride, maleic acid, or fumaric acid and vinyl alcohol; polyethylene glycol, polyethyleneoxide, polyvinyl pyrrolidone, modified polyacrylic acid, oxidized starch, starch phosphate, casein, various modified starch, and an acrylonitrile-butadiene copolymer hydrogenated product. Among these compounds, carboxymethylcellulose, an ammonium salt thereof, and an alkali metal salt thereof are preferably used. Note that, in the present invention, "(modified) poly" means "unmodified poly" or "modified poly."

The use amount of a thickening agent is preferably 1 part by weight or less, and more preferably 0.1 parts by weight or less with respect to 100 parts by weight of the synthetic isoprene polymer.

Examples of a pH adjusting agent for adjusting the pH of the latex include an alkali metal hydroxide such as sodium hydroxide or potassium hydroxide; an alkali metal carbonate such as sodium carbonate or potassium carbonate; an alkali metal hydrogen carbonate such as sodium hydrogen carbonate; ammonia; and an organic amine compound such as trimethylamine or triethanolamine. However, an alkali metal hydroxide or ammonia is preferable.

The pH of the latex is preferably from 7 to 12, more preferably from 8 to 11, and most preferably from 9 to 10. Note that, it is only required to adjust the pH to an optimum pH in accordance with a characteristic of a water-soluble substance such as a surfactant or a thickening agent to be used.

Further, a volume average particle diameter of latex particles (synthetic isoprene polymer particles) in the synthetic isoprene polymer latex is preferably from 0.5 to 10 μm, more preferably from 0.5 to 3 μm, and particularly preferably from 0.5 to 2 μm. When the volume average particle diameter of latex particles is within the above range, a phenomenon that the viscosity of the latex is too high and it is difficult to handle the latex due to an excessively small volume average particle diameter can be suppressed. On the contrary, a phenomenon that a coating is generated on a surface of the latex during storage of the synthetic isoprene polymer latex due to an excessively large volume average particle diameter can be suppressed. A maximum particle diameter of latex particles is usually 30 μm or less, preferably 10 μm or less, more preferably 8 μm or less, and most preferably 7 μm or less. A ratio of particles having the maximum particle diameter with respect to the total particles is usually 1% or less, preferably 0.5% or less, more preferably 0.1% or less, and most preferably 0.01% or less.

The conductivity of the synthetic isoprene polymer latex is preferably from 0.5 mS/cm to 2.0 mS/cm. When the conductivity is within the above range, a phenomenon that a large amount of aggregates are generated during emulsification or concentration due to an excessively small conductivity can be suppressed, and a phenomenon that foaming occurs vigorously during removal of a solvent or during transportation or blending of a dip-forming composition to generate a defect such as a pinhole in the resulting dip-formed article due to an excessively large conductivity can be suppressed.

Note that, the conductivity is a value measured at a measurement temperature of 25° C. using a conductivity meter (product name: SG78-FK2) manufactured by METTLER-TOLEDO International Inc.

The total content of an alicyclic hydrocarbon solvent, an aliphatic hydrocarbon solvent, and an aromatic hydrocarbon solvent for the synthetic isoprene polymer latex is preferably 500 ppm by weight or less. Further, as an alicyclic hydrocarbon solvent, cyclohexane is preferable. As an aliphatic hydrocarbon solvent, n-pentane is preferable. As an aromatic hydrocarbon solvent, toluene is preferable. When the total content of an alicyclic hydrocarbon solvent, an aliphatic hydrocarbon solvent, and an aromatic hydrocarbon solvent is too large, particularly when the total content of cyclohexane, pentane, and toluene is too large, a dip-forming composition tends to have a sharp odor.

Note that, the total content of an alicyclic hydrocarbon solvent, an aliphatic hydrocarbon solvent, and an aromatic hydrocarbon solvent can be measured by a generally available measuring method such as a gas chromatography method.

Further, an additive such as a pH adjusting agent, a defoamer, a preservative, a crosslinking agent, a chelating agent, an oxygen scavenger, a dispersing agent, or an anti-aging agent usually blended in a field of a latex may be blended to the synthetic isoprene polymer latex.

(Dip-Forming Composition)

The dip-forming composition of the present invention contains the above dip-forming synthetic isoprene polymer latex, a vulcanizing agent, and a vulcanization accelerator. Further, the dip-forming composition of the present invention may contain other components, as necessary.

(Vulcanizing Agent)

Examples of the vulcanizing agent include sulfur such as powdered sulfur, flowers of sulfur, precipitated sulfur, colloidal sulfur, surface-treated sulfur, or insoluble sulfur; and a sulfur-based vulcanizing agent such as sulfur chloride, sulfur dichloride, morpholine-disulfide, alkylphenol-disulfide, N,N'-dithio-bis(hexahydro-2H-azepinone-2), phosphorus-containing polysulfide, polymer polysulfide, or 2-(4'-morpholinodithio) benzothiazole. Among these substances, sulfur can be preferably used. These vulcanizing agents may be used singly or in combination of two or more kinds thereof.

The use amount of a vulcanizing agent is not particularly limited, but is preferably from 0.1 to 10 parts by weight, and more preferably from 0.2 to 3 parts by weight with respect to 100 parts by weight of the synthetic isoprene polymer. When the use amount of a vulcanizing agent is within the above range, a phenomenon that the tensile strength of a dip-formed article is lowered due to an excessively small or large use amount of the vulcanizing agent can be suppressed.

(Vulcanization Accelerator)

As the vulcanization accelerator, a vulcanization accelerator usually used in dip-forming can be used. Examples thereof include dithiocarbamic acids such as diethyl dithiocarbamic acid, dibutyl dithiocarbamic acid, di-2-ethylhexyl dithiocarbamic acid, dicyclohexyl dithiocarbamic acid, diphenyl dithiocarbamic acid, or dibenzyl dithiocarbamic acid, and a zinc salt thereof; 2-mercaptobenzothiazole, zinc 2-mercaptobenzothiazole, 2-mercapto thiazoline, dibenzothiazyl-disulfide, 2-(2,4-dinitrophenylthio) benzothiazole, 2-(N,N-diethylthio-carbylthio) benzothiazole, 2-(2,6-dimethyl-4-morpholinothio) benzothiazole, 2-(4'-morpholinodithio) benzothiazole, 4-morpholinyl-2-benzothiazyl-disulfide, and 1,3-bis(2-benzothiazyl-mercaptomethyl) urea. However, zinc diethyl dithiocarbamate, 2-mercaptobenzothiazole, and zinc 2-mercaptobenzothiazole are preferable. These vulcanization accelerators may be used singly or in combination of two or more kinds thereof.

The use amount of a vulcanization accelerator is 1.2 parts by weight or more, preferably 1.3 parts by weight or more, and preferably 1.5 parts by weight or less with respect to 100 parts by weight of the synthetic isoprene polymer. When the use amount of a vulcanization accelerator is within the above range, a phenomenon that the tensile strength of a dip-formed article is lowered due to an excessively small use amount of the vulcanization accelerator can be suppressed, and a phenomenon that the elongation and tensile strength of a dip-formed article are lowered due to an excessively large use amount of the vulcanization accelerator can be suppressed.

(Other Components)

(Zinc Oxide)

The dip-forming composition of the present invention may further contain zinc oxide, as necessary. The content of zinc oxide is not particularly limited, but is preferably from 0.1 to 5 parts by weight, and more preferably from 0.2 to 2 parts by weight with respect to 100 parts by weight of the synthetic isoprene polymer. When the content of zinc oxide is within the above range, a phenomenon that the tensile strength of a dip-formed article is lowered due to an excessively small content of zinc oxide can be suppressed, and a phenomenon that stability of a synthetic isoprene polymer particle in the dip-forming composition is lowered to generate a coarse aggregate due to an excessively large content of zinc oxide can be suppressed.

(Dispersing Agent)

The dip-forming composition of the present invention may contain a dispersing agent, as necessary. Examples of the dispersing agent include an anionic surfactant such as a sodium or potassium salt of a fatty acid such as lauric acid, myristic acid, palmitic acid, oleic acid, linolenic acid, or rosin acid, alkyl benzene sulfonate such as sodium dodecylbenzenesulfonate, higher alcohol sulfate, or alkyl sulfosuccinate. However, sodium dodecylbenzenesulfonate is particularly preferable. Note that, these surfactants may be used singly or in combination of two or more kinds thereof.

The use amount of a dispersing agent is preferably from 0.01 to 5 parts by weight, and more preferably from 0.05 to 3 parts by weight with respect to 100 parts by weight of the synthetic isoprene polymer. When the use amount of a dispersing agent is within the above range, a phenomenon that blending stability of the dip-forming composition is lowered or the amount of aggregates is increased during pre-vulcanization due to an excessively small use amount of the dispersing agent can be suppressed, and a phenomenon that foaming of the dip-forming composition occurs easily and a pinhole is generated easily due to an excessively large use amount of the dispersing agent can be suppressed.

(Compounding Agent)

A compounding agent such as an anti-aging agent; a reinforcing agent such as carbon black, silica, or talc; a filler such as calcium carbonate or clay; an ultraviolet absorber; or a plasticizer can be further blended to the dip-forming composition.

Examples of the anti-aging agent include a phenol-based anti-aging agent containing no sulfur atom, such as 2,6-di-4-methylphenol, 2,6-di-t-butylphenol, butylhydroxyanisole, 2,6-di-t-butyl-α-dimethylamino-p-cresol, octadecyl-3-(3,5-di-t-butyl-4-hydroxyphenyl) propionate, styrenated phenol, 2,2'-methylene-bis(6-α-methyl-benzyl-p-cresol), 4,4'-methylene bis(2,6-di-t-butylphenol), 2,2'-methylene-bis(4-methyl-6-t-butylphenol), alkylated bisphenol, or a product of a butylation reaction between p-cresol and dicyclopentadiene; a thio bisphenol-based anti-aging agent such as 2,2'-thiobis-(4-methyl-6-t-butylphenol), 4,4'-thiobis-(6-t-butyl-o-cresol), or 2,6-di-t-butyl-4-(4,6-bis(octylthio)-1,3,5-triazin-2-ylamino) phenol; a phosphite-based anti-aging agent such as tris(nonylphenyl) phosphite, diphenyl isodecyl phosphite, or tetraphenyl dipropylene glycol-diphosphite; a sulfur ester-based anti-aging agent such as dilauryl thiodipropionate; an amine-based anti-aging agent such as phenyl-α-naphthylamine, phenyl-β-naphthylamine, p-(p-toluene-sulfonyl amido)-diphenylamine, 4,4'-(α,α-dimethylbenzyl) diphenylamine, N,N-diphenyl-p-phenylenediamine, N-isopropyl-N'-phenyl-p-phenylenediamine, or a butyraldehyde-aniline condensate; a quinoline-based anti-aging agent such as 6-ethoxy-2,2,4-trimethyl-1,2-dihydroquinoline; and a hydroquinone-based anti-aging agent such as 2,5-di-(t-amyl) hydroquinone. These anti-aging agents may be used singly or in combination of two or more kinds thereof.

The use amount of an anti-aging agent is preferably from 0.05 to 10 parts by weight, and more preferably from 0.1 to 5 parts by weight with respect to 100 parts by weight of the synthetic isoprene polymer. When the use amount of an anti-aging agent is within the above range, a phenomenon that the synthetic isoprene polymer is deteriorated due to an excessively small use amount of the anti-aging agent can be suppressed, and a phenomenon that the tensile strength of a dip-formed article is lowered due to an excessively large use amount of the anti-aging agent can be suppressed.

A method for preparing the dip-forming composition is not particularly limited. Examples of the preparing method include a method for mixing a vulcanizing agent, a vulcanization accelerator, the above dispersing agent, and other components blended as necessary with a synthetic isoprene polymer latex using a disperser such as a ball mill, a kneader, or a disper, and a method for preparing an aqueous dispersion containing desired compounding components other than a synthetic isoprene polymer latex in advance using the above disperser, and then mixing the aqueous dispersion with the synthetic isoprene polymer latex. Further, the dispersing agent is mixed with the synthetic isoprene polymer latex in advance, and then a vulcanizing agent, a vulcanization accelerator, and other components blended as necessary can be added.

The pH of the dip-forming composition is preferably 7 or more, and more preferably from 8 to 12.

Further, the solid content concentration of the dip-forming composition is, for example, from 15 to 65% by weight.

The dip-forming composition is preferably subjected to aging (also referred to as pre-vulcanization) before being subjected to dip-forming.

Time for pre-vulcanization is not particularly limited depending on the pre-vulcanization temperature, but is preferably from one to 14 days, and more preferably from one to seven days. When the time for pre-vulcanization is within the above range, a phenomenon that the tensile strength of the resulting dip-formed article is lowered due to excessively short or long time for pre-vulcanization can be suppressed.

The resulting product is preferably stored at a temperature preferably of 10° C. to 30° C. after being subjected to pre-vulcanization and before being subjected to dip-forming. When the temperature for storage is within the above range, a phenomenon that the tensile strength of the resulting dip-formed article is lowered due to storage at an excessively high temperature can be suppressed.

(Dip-Formed Article)

The dip-formed article of the present invention is obtained by dip-forming the dip-forming composition of the present invention.

Dip-forming is a method for dipping a mold in a dip-forming composition, depositing the composition on a surface of the mold, then pulling up the mold from the composition, and drying the composition deposited on the surface of the mold. The mold before being dipped in the dip-forming composition may be preheated. Before the mold is dipped in the dip-forming composition or after the mold is pulled up from the dip-forming composition, a coagulating agent can be used, as necessary. Specific examples of a method for using a coagulating agent include a method for dipping a mold in a coagulating agent solution to deposit the coagulating agent on the mold before the mold dipping in a dip-forming composition (anode coagulant dipping method), and a method for dipping a mold on which a dip-forming composition is deposited in a coagulating agent solution (Teague coagulant dipping method). Among these methods, the anode coagulant dipping method is preferable from a viewpoint of obtaining a dip-formed article having less thickness unevenness.

Specific examples of the coagulating agent include a water-soluble polyvalent metal salt such as a metal halide including barium chloride, calcium chloride, magnesium chloride, zinc chloride, and aluminum chloride; a nitrate including barium nitrate, calcium nitrate, and zinc nitrate; an acetate including barium acetate, calcium acetate, and zinc acetate; or a sulfate including calcium sulfate, magnesium sulfate, and aluminum sulfate. Among these salts, a calcium salt is preferable, and calcium nitrate is more preferable. These water-soluble polyvalent metal salts can be used singly or in combination of two or more kinds thereof, and are preferably used in a state of an aqueous solution. This aqueous solution can further contain an aqueous organic solvent such as methyl alcohol or ethyl alcohol, or a non-ionic surfactant. The concentration of a coagulating agent depends on the kind of a water-soluble polyvalent metal salt, but is preferably from 5 to 50% by weight, and more preferably from 8 to 30% by weight.

After a mold is pulled up from a dip-forming composition, for example, a deposit formed on the mold is dried by heating. Drying conditions are appropriately selected.

Subsequently, the deposit formed on the mold is vulcanized by heating.

Heating conditions during vulcanization are not particularly limited. However, a heating temperature is preferably from 60 to 150° C., and more preferably from 100 to 130° C., and heating time is preferably from 10 to 120 minutes. A heating method is not particularly limited, but examples thereof include a method for heating the mold by warm air in an oven and a method for heating the mold by irradiation with an infrared ray.

Before heating or after heating the mold on which the dip-forming composition is deposited, the mold is preferably washed with water or warm water in order to remove water-soluble impurities (for example, excessive surfactant or coagulating agent).

The dip-formed article after vulcanization is detached from the mold. Specific examples of a detaching method include a method for peeling the dip-formed article from the mold by hand and a method for peeling the dip-formed article with a hydraulic pressure or a compressed air pressure. If the dip-formed article in the middle of formation has a sufficient strength against detachment, the dip-formed article may be detached in an intermediate step, and may be subjected to a subsequent treatment continuously.

When the dip-formed article is a glove, in order to prevent from sticking to each other at contacting surfaces, and to improve the slip at the time of attachment or detachment, inorganic fine particles such as talc or calcium carbonate, or organic fine particles such as starch particles may be spread on a surface of the glove, an elastomer layer containing fine particles may be formed on a surface of the glove, or a surface layer of the glove may be chlorinated.

EXAMPLES

Hereinafter, the present invention will be described in detail with Examples, but the present invention is not limited to these Examples. Note that, in the following description, "%" and "parts" are based on a weight, unless otherwise indicated. Note that, various physical properties were measured as follows.

(Weight Average Molecular Weight)

A synthetic isoprene polymer latex obtained in each of Examples and Comparative Examples was dissolved in tetrahydrofuran such that the solid content concentration thereof was 0.1% by weight. This solution was subjected to gel permeation chromatography, and the result was calculated as a weight average molecular weight in terms of standard polystyrene of a synthetic isoprene polymer.

(Content Ratio of Cis-Bond Unit (1,4-Cis Structure))

Methanol was added to a synthetic isoprene polymer latex obtained in each of Examples and Comparative Examples, and the resulting product was solidified. The resulting solidified product was dried, and then was subjected to $^1$H-NMR analysis to indicate a content ratio of a cis-bond unit (1,4-cis structure) with respect to all the isoprene units in the synthetic isoprene polymer.

(Mode Diameter and Median Diameter)

A mode diameter and a median diameter of a synthetic isoprene polymer latex obtained in each of Examples and Comparative Examples were measured using a laser diffraction type particle size distribution measuring apparatus (SALD-2200, manufactured by Shimadzu Corporation). A mode diameter and a median diameter were read from particle diameter measurement results displayed.

(Brookfield Viscosity)

In Examples and Comparative Examples, the viscosity of a synthetic isoprene polymer latex was measured using a B-type viscometer (Brookfield viscometer, model BL, manufactured by Tokyo Keiki Inc.) at a liquid temperature of 25° C.

Manufacturing Example 1

(Manufacturing Synthetic Isoprene Polymer)

1150 parts of cyclohexane, 100 parts of isoprene, and 0.0029 parts of tetramethylethylenediamine were put into an autoclave with a stirrer, which had been dried and had been subjected to nitrogen replacement. The temperature in the autoclave was set to 60° C., and 0.0273 parts of a n-butyl lithium 15% by weight hexane catalyst solution was added under stirring to perform a reaction for one hour. A polymerization reactivity of 99% was obtained. 0.0031 parts of methanol was added to the resulting polymer solution as a polymerization terminator to terminate the reaction. The resulting synthetic isoprene polymer had a weight average molecular weight (Mw) of 1.76 million, Mw/Mn=1.24, a content ratio of a cis-bond unit (1,4-cis structure) of 82%.

Example 1

(Manufacturing Synthetic Isoprene Polymer Latex)

1250 parts of a cyclohexane solution of the above synthetic isoprene polymer (100 parts of synthetic isoprene polymer and 1150 parts of cyclohexane) and 1245 parts of a surfactant aqueous solution containing 0.8% by weight of sodium rosinate (product name "Rondis N-18" manufactured by Arakawa Chemical Industries, Ltd.) as a surfactant were prepared.

Then, the whole amount of the cyclohexane solution of the synthetic isoprene polymer and the whole amount of the surfactant aqueous solution were put in a container made of SUS304, and were stirred and mixed, followed by being subjected to an emulsification dispersion treatment with a homogenizer (product name "MILDER MDN-303V", manufactured by Pacific Ocean Kiko Co.) to obtain an emulsified mixed liquid.

Subsequently, cyclohexane was distilled off from the above emulsified mixed liquid in a tank for solvent removal to obtain a synthetic isoprene polymer latex. Then, aggregates in the synthetic isoprene polymer latex were removed using a 200-mesh stainless steel wire net.

Subsequently, the synthetic isoprene polymer latex from which aggregates had been removed was subjected to centrifugation with a sealed disk type continuous centrifuge (SGR509 manufactured by Alfa Laval Inc.) at 9000 G at a liquid flow rate of 1600 L/hr until the solid content concentration became 56%. When a bowl of the centrifuge was opened, and a disk was opened, no aggregates were observed.

As a result, a synthetic isoprene polymer latex in Example 1, having a solid content concentration of 56%, a Brookfield viscosity ($V_{56}$) of 17 mPa·s, pH 10, a median diameter of 1.36 µm, and a mode diameter of 1.41 µm (mode diameter/median diameter=1.04) was obtained. This synthetic isoprene polymer latex was concentrated again until the solid content concentration became 66%, and a Brookfield viscosity ($V_{66}$) thereof was measured. As a result, the viscosity was 112 mPa·s, and a difference between $V_{66}$ and $V_{56}$ ($V_{66}$-$V_{56}$) was 95 mPa·s. Table 1 indicates results thereof.

Example 2

A synthetic isoprene polymer latex was obtained in a similar manner to Example 1 except that 1245 parts of a surfactant aqueous solution containing 1.2% by weight of sodium rosinate (product name "Rondis N-18", manufactured by Arakawa Chemical Industries, Ltd.) and 0.08% by weight of sodium dodecylbenzenesulfonate (product name "NEOPELEX G-15", manufactured by Kao Corporation) was used. A particle diameter and a Brookfield viscosity of this latex were measured in a similar manner to Example 1, and Table 1 indicates results thereof.

Comparative Example 1

A synthetic isoprene polymer latex was obtained in a similar manner to Example 1 except that 1245 parts of a surfactant aqueous solution containing 0.8% by weight of sodium rosinate (product name "Rondis N-18", manufactured by Arakawa Chemical Industries, Ltd.) and 0.6% by weight of sodium dodecylbenzenesulfonate (product name "NEOPELEX G-15", manufactured by Kao Corporation) was used. A particle diameter and a Brookfield viscosity of this latex were measured in a similar manner to Example 1, and Table 1 indicates results thereof.

Comparative Example 2

In manufacturing a synthetic isoprene polymer latex, a synthetic isoprene polymer used was changed to a synthetic isoprene polymer (product name "IR2200L", manufactured by Zeon Corporation, content ratio of cis-bond unit (1,4-cis structure):98%) having a weight average molecular weight of 1,300,000, obtained by subjecting isoprene to solution polymerization using a Ziegler-Natta catalyst. In addition, a synthetic isoprene polymer latex was obtained in a similar manner to Example 1 except that 1245 parts of a surfactant aqueous solution containing 0.6% by weight of sodium rosinate (product name "Rondis N-18", manufactured by Arakawa Chemical Industries, Ltd.) and 0.2% by weight of sodium dodecylbenzenesulfonate (product name "NEOPELEX G-15", manufactured by Kao Corporation) was used. A particle diameter and a Brookfield viscosity of this latex were measured in a similar manner to Example 1, and Table 1 indicates results thereof.

Comparative Example 3

A synthetic isoprene polymer latex was obtained in a similar manner to Comparative Example 2 except that 1245 parts of a surfactant aqueous solution containing 0.8% by weight of sodium rosinate (product name "Rondis N-18", manufactured by Arakawa Chemical Industries, Ltd.) and 0.4% by weight of sodium dodecylbenzenesulfonate (product name "NEOPELEX G-15", manufactured by Kao Corporation) was used. A particle diameter and a Brookfield viscosity of this latex were measured in a similar manner to Example 1, and Table 1 indicates results thereof.

TABLE 1

|  |  |  | Ex. 1 | Ex. 2 | Comp. Ex. 1 | Comp. Ex. 2 | Comp. Ex. 3 |
| --- | --- | --- | --- | --- | --- | --- | --- |
| Synthetic isoprene polymer | Synthetic isoprene polymer which has been subjected to solution polymerization using n-butyl lithium | (phr) | 100 | 100 | 100 | — | — |
|  | Synthetic isoprene polymer which has been subjected to solution polymerization using Ziegler-Natta catalyst | (phr) | — | — | — | 100 | 100 |
| Surfactant for emulsification | Sodium rosinate | (phr) | 10.0 | 15.0 | 10.0 | 7.5 | 10.0 |
|  | Sodium dodecylbenzenesulfonate | (phr) | — | 1.0 | 7.5 | 2.5 | 5.0 |
| Physical properties of synthetic isoprene polymer latex | Mode diameter of synthetic isoprene polymer latex | (μm) | 1.41 | 1.12 | 1.00 | 1.16 | 0.76 |
|  | Median diameter of synthetic isoprene polymer latex | (μm) | 1.36 | 1.09 | 0.95 | 1.10 | 1.02 |
|  | Ratio between mode diameter and median diameter (mode diameter/median diameter) | — | 1.04 | 1.03 | 1.05 | 1.05 | 0.74 |
|  | Brookfield viscosity at solid content concentration of 56% ($V_{56}$) | (mPa·s) | 17 | 34 | 47 | 72 | 80 |
|  | Brookfield viscosity at solid content concentration or 66% ($V_{66}$) | (mPa·s) | 112 | 173 | 381 | 327 | 585 |
|  | Difference between $V_{66}$ and $V_{56}$ ($V_{66} - V_{56}$) | (mPa·s) | 95 | 139 | 334 | 255 | 505 |

As indicated in Table 1, when a dip-forming synthetic isoprene polymer latex containing a synthetic isoprene polymer obtained by solution polymerization using n-butyl lithium as a polymerization catalyst had a ratio between a mode diameter and a median diameter (mode diameter/median diameter) of a particle diameter of the latex of 0.8 or more, a Brookfield viscosity difference ($V_{66}-V_{56}$) between a Brookfield viscosity at a solid content concentration of 56% ($V_{56}$) and a Brookfield viscosity at a solid content concentration of 66% ($V_{66}$) was 200 mPa·s or less (Examples 1 and 2).

Further, in a case where a synthetic isoprene polymer obtained using n-butyl lithium as a polymerization catalyst was used, even when a ratio between a mode diameter and a median diameter (mode diameter/median diameter) of a particle diameter of the obtained latex was 0.8 or more, when the use amount of sodium dodecylbenzenesulfonate used as a surfactant was large, a Brookfield viscosity difference ($V_{66}-V_{56}$) between a Brookfield viscosity at a solid content concentration of 56% ($V_{56}$) and a Brookfield viscosity at a solid content concentration of 66% ($V_{66}$) was more than 200 mPa·s (Comparative Example 1).

Further, in a case where a synthetic isoprene polymer obtained using a Ziegler-Natta catalyst in place of n-butyl lithium as a polymerization catalyst was used, even when a ratio between a mode diameter and a median diameter (mode diameter/median diameter) of a particle diameter of the obtained latex was 0.8 or more, a Brookfield viscosity difference ($V_{66}-V_{56}$) between a Brookfield viscosity at a solid content concentration of 56% ($V_{56}$) and a Brookfield viscosity at a solid content concentration of 66% ($V_{66}$) was more than 200 mPa·s (Comparative Example 2).

Further, in a case where a synthetic isoprene polymer obtained using a Ziegler-Natta catalyst in place of n-butyl lithium as a polymerization catalyst was used, when a ratio between a mode diameter and a median diameter (mode diameter/median diameter) of a particle diameter of the obtained latex was less than 0.8, a Brookfield viscosity difference ($V_{66}-V_{56}$) between a Brookfield viscosity at a solid content concentration of 56% ($V_{56}$) and a Brookfield viscosity at a solid content concentration of 66% ($V_{66}$) was much larger than 200 mPa·s (Comparative Example 3).

(Transportation Test)

Next, a transportation test with a diaphragm pump (Wilden Corporation) was performed using a latex having a solid content concentration of 66%, obtained in each of Examples 1 and 2 and Comparative Examples 1 to 3. The whole amount of a latex in each of Examples 1 and 2 could be transported without any problem. However, in Comparative Examples 1 to 3, clogging occurred when about a half amount was transported, and transportation became impossible. When a diaphragm portion was decomposed and an inside thereof was inspected, a large amount of aggregates were generated, and a transportation pipe was clogged.

(Dip-Forming Test)

A latex having a solid content concentration of 66%, obtained in each of Examples 1 and 2 and Comparative Examples 1 to 3 was diluted with distilled water such that the Brookfield viscosity thereof was 60 mPa·s. A glass mold coated with a coagulating agent was dipped in the latex for a period of time indicated in Table 2, was then taken out therefrom, was dried at room temperature for 60 minutes, was then dipped in warm water at 60° C. for two minutes, and was dried with air at room temperature for 30 minutes. Subsequently, a film formed on a surface of the glass mold was peeled. Film thicknesses of an upper portion, an intermediate portion, and a lower portion of the resulting film were measured. Table 2 indicates results thereof. In Comparative Examples 1 to 3, long dipping time was required for obtaining a film thickness almost the same as those in Examples 1 and 2, and uniformity of a film thickness was deteriorated.

TABLE 2

|  | Ex. 1 | Ex. 2 | Comp. Ex. 1 | Comp. Ex. 2 | Comp. Ex. 3 |
| --- | --- | --- | --- | --- | --- |
| Dipping time (sec) | 10 | 10 | 30 | 30 | 30 |
| Film thicknesses of upper portion (μm) | 0.19 | 0.18 | 0.17 | 0.18 | 0.16 |
| Film thicknesses of intermediate portion (μm) | 0.21 | 0.20 | 0.23 | 0.22 | 0.26 |
| Film thicknesses of lower portion (μm) | 0.22 | 0.21 | 0.28 | 0.26 | 0.30 |

The invention claimed is:

1. A dip-forming synthetic isoprene polymer latex comprising a synthetic isoprene polymer obtained by solution polymerization using an alkyllithium polymerization catalyst, wherein a weight average molecular weight of the synthetic isoprene polymer is from 800,000 to 1,760,000, a ratio between a mode diameter and a median diameter (mode diameter/median diameter) of a particle diameter of the latex is 0.8 or more, the latex is obtained by emulsifying in water a solution or a fine suspension of the synthetic isoprene polymer in an organic solvent in the presence of a surfactant, a pH of the latex is from 7 to 12, and a Brookfield viscosity difference ($V_{66}$–$V_{56}$) between a Brookfield viscosity of the latex containing the synthetic isoprene polymer at a solid content concentration of 56% ($V_{56}$) and a Brookfield viscosity of the latex containing the same synthetic isoprene polymer at a solid content concentration of 66% ($V_{66}$) is 200 mPa·s or less, wherein ($V_{56}$) and ($V_{66}$) are each measured using a Brookfield viscometer at a liquid temperature of 25° C.

2. A dip-forming composition comprising the dip-forming synthetic isoprene polymer latex according to claim 1, a sulfur-based vulcanizing agent, and a vulcanization accelerator.

3. A dip-formed article obtained by dip-forming the dip-forming composition according to claim 2.

4. The dip-forming synthetic isoprene polymer latex according to claim 1, wherein mode diameter/median diameter is 0.9 or more and 1.8 or less.

5. The dip-forming synthetic isoprene polymer latex according to claim 1, wherein mode diameter/median diameter is 1.0 or more and 1.5 or less.

6. The dip-forming synthetic isoprene polymer latex according to claim 1, wherein mode diameter/median diameter is 1.0 or more and 1.1 or less.

7. The dip-forming synthetic isoprene polymer latex according to claim 1, wherein the solid content of the synthetic isoprene polymer latex is 30 to 70% by weight.

8. The dip-forming synthetic isoprene polymer latex according to claim 1, wherein the solid content of the synthetic isoprene polymer latex is 40 to 70% by weight.

9. The dip-forming synthetic isoprene polymer latex according to claim 1, wherein $V_{66}$–$V_{56}$ is 150 mPa·s or less.

10. The dip-forming synthetic isoprene polymer latex according to claim 1, further comprising a thickening agent, wherein a content of the thickening agent is 1 part by weight or less with respect to 100 parts by weight of the synthetic isoprene polymer.

* * * * *